US008358711B2

(12) United States Patent
Marsili

(10) Patent No.: US 8,358,711 B2
(45) Date of Patent: Jan. 22, 2013

(54) CIRCUIT ARRANGEMENT FOR REDUCING A CREST FACTOR, AND METHOD FOR REDUCING A SIGNAL DYNAMIC RANGE

(75) Inventor: Stefano Marsili, Fürnitz (AT)

(73) Assignee: Lantiq Deutschland GmbH, Neubiberg (DE)

( * ) Notice: Subject to any disclaimer, the term of this patent is extended or adjusted under 35 U.S.C. 154(b) by 1218 days.

(21) Appl. No.: 11/603,745

(22) Filed: Nov. 22, 2006

(65) Prior Publication Data

US 2007/0129026 A1 Jun. 7, 2007

(30) Foreign Application Priority Data

Nov. 29, 2005 (DE) .......................... 10 2005 056 954

(51) Int. Cl.
*H04L 27/28* (2006.01)
(52) U.S. Cl. ........ 375/260; 375/130; 375/135; 375/146; 375/148; 375/295; 375/296; 375/297; 375/298; 375/299; 375/300; 370/320; 370/335; 370/342; 370/441; 455/114.2; 455/115.1
(58) Field of Classification Search .......... 375/295–300, 375/267; 455/114.2, 115.1
See application file for complete search history.

(56) References Cited

U.S. PATENT DOCUMENTS

| 7,023,900 | B2* | 4/2006 | Cleveland | 375/146 |
| 2002/0101935 | A1* | 8/2002 | Wright et al. | 375/295 |
| 2003/0063683 | A1* | 4/2003 | MacFarlane Shearer et al. | 375/295 |
| 2004/0052314 | A1* | 3/2004 | Copeland | 375/296 |
| 2004/0218689 | A1* | 11/2004 | Akhtman | 375/296 |
| 2006/0014500 | A1 | 1/2006 | Marsili | |
| 2006/0029158 | A1* | 2/2006 | Lipka et al. | 375/300 |
| 2006/0029185 | A1* | 2/2006 | Baur et al. | 378/141 |

FOREIGN PATENT DOCUMENTS

| CN | 1404251 A | 3/2003 |
| DE | 100 15 257 A1 | 10/2001 |
| DE | 103 20 917 A1 | 12/2004 |
| DE | 103 25 839 A1 | 1/2005 |
| EP | 1 499 035 A2 | 1/2005 |

(Continued)

OTHER PUBLICATIONS

"Effect of Clipping in Wideband CDMA System and Simple Algorithm for Peak Windowing", Olli Väämänen, Jouko Vankka and Kari Halonen, Proc. World Wireless congress, San Francisco, May 2002, pp. 614-619.

(Continued)

*Primary Examiner* — David Ometz
*Assistant Examiner* — Eboni Hughes
(74) *Attorney, Agent, or Firm* — Eschweiler & Associates, LLC

(57) ABSTRACT

To reduce the crest factor of a total signal, the signal dynamic range is corrected in baseband upstream of the interpolation filters. To this end, provision is made for the input of a correction device to be coupled to at least two signal sources which are designed to provide digital signals on different frequency bands. The correction device is designed to determine correction factors from the digital signals applied to the input and use them to alter the respective digital signals. The output of the correction device is coupled to a first and at least one second interpolation filter. This allows reduction of the signal dynamic range in baseband, which reduces the crest factor without having to accept substantial losses in signal quality.

14 Claims, 8 Drawing Sheets

FOREIGN PATENT DOCUMENTS

EP    1 285 508 B1    3/2006

OTHER PUBLICATIONS

"Minimization of the Intermodulation Distortion of a Nonlinearly Amplified OFDM Signal", M. Pauli and H.P. Kuchenbecker, Wireless Personal Communications, vol. 4, No. 1, Apr. 1997, 8 pgs.

"Reducing Out-Of-Band Emissions Due to Nonlinearities in OFDM Systems", Mattias Lampe and Hermann Rohling, IEEE $49^{th}$ Vehicular Technology Conference, vol. 3, May 1999, pp. 2255-2259.

"Additiv Algorithm for Reduction of Cresfactor (AARC)", Nabil Hentati and Marc Schrader, $5^{th}$ International OFDM Workshop, Sep. 2000, pp. 27-1-27-5.

"Minimizing the Peak-to-Average Power Ratio of OFDM Signals Via Convex Optimization", Alok Aggarwal and Teresa H. Meng, Proc. IEEE Global Telecommunications Conference, vol. 4, Dec. 2003, 4 pgs.

3G TS 25.213 V5.0.0 (Mar. 2002) $3^{rd}$ Generation Partnership Project; Technical Specification Group Radio Access Network; Spreading and Modulation (FDD) (Release 5), Mar. 2003, 27 pgs.

3GPP TS 25.141 V6.2.0 (Jun. 2003) $3^{rd}$ Generation Partnership Project; Technical Specification Group Rdio Access Network; Base Station (BS) Conformance Testing (FDD) (Release 6) Jun. 2003, 158 pgs.

\* cited by examiner

--- K1 —— K2

CIRCUIT ARRANGEMENT FOR REDUCING A CREST FACTOR, AND METHOD FOR REDUCING A SIGNAL DYNAMIC RANGE

REFERENCE TO RELATED APPLICATIONS

This application claims the benefit of the priority date of German application DE 10 2005 056 954.4, filed on Nov. 29, 2005, the contents of which are herein incorporated by reference in their entirety.

FIELD OF THE INVENTION

The invention relates to a circuit arrangement for reducing a crest factor and also to the use thereof. The invention also relates to a method for reducing a signal dynamic range.

BACKGROUND OF THE INVENTION

In modern communication methods, the data to be transmitted are both phase modulated and amplitude modulated onto a carrier signal. Very often, digital types of modulation are used for such communication methods. Examples of these are quadrature amplitude modulation (QAM), "Quadrature Phase Shift Keying" (QPSK) or Orthogonal Frequency Division Multiplexing (OFDM). To be able to make the best use of the available frequency space, use is additionally being made of transmitting a plurality of different signals simultaneously on the same carrier frequency. One example of a communication standard of this kind which uses this principal is the "Universal Mobile Telecommunication System" (UMTS standard) from the "3rd Generation Partnership Project" (3GPP).

In the case of this mobile radio standard the various data to be transmitted are processed in a frequency band with a unique identification code. The data processed with the different identification codes can then be transmitted together on the frequency band. Processing with different identification is called a code spreading method or else "Code Division Multiple Access" (CDMA).

The fact that different data are transmitted simultaneously may result in the amplitude of the total signal fluctuating greatly over time in this frequency band. Whereas the average power of the total signal is relatively constant, for example, individual signal components may have a very high amplitude far above the average. In this case, the probability function for the components arising in the signal which are above the average power is called the "Complementary Cumulative Distribution Function" (CCDF). FIG. 10 shows an exemplary illustration of such a function for a typical WCDMA signal. In this case, it can be seen that the total signal contains components which are up to n dB above the average power. The maximum value which occurs above the average power, which maximum value has a low probability, is called the crest factor.

In the case of the UMTS mobile radio standard, it is possible to use adjacent frequency bands to transmit different, wideband signals simultaneously. Thus, a frequency interval of 5 MHz between the individual carrier frequencies of each frequency band is provided for the UMTS standard. In a base station, which sends signals to different mobile communication appliances, different transmission output stages can be implemented individually for each frequency band. This means essentially parallel processing and a dedicated transmission output stage, including an output power amplifier, for each individual frequency band. Another option is to provide just a single transmission output stage within the base station and to feed a common baseband signal for all the signal sources into said transmission output stage.

FIG. 11 shows a schematic illustration of such a base station for the UMTS/WCDMA mobile radio standard. In this case, the output of the individual WCDMA signal sources, WCDMA-S1 to WCDMA-SM, which provide the signal to be transmitted is connected to a respective shaping filter, S Filter. The digital signal which is output by the sources is interpolated by the shaping filters, which have a root raised co-sign (RRC) shaping response with a "roll-off" of 22%, as prescribed in this mobile radio standard.

The filtered digital signal is then multiplied by a signal from a numerically controlled oscillator NCO and in this way is split over the various frequency bands. The numerically controlled oscillators NCO are chosen such that following the multiplication the individual frequency bands have a respective frequency interval of 5 MHz. The individual frequency bands are then added and are converted into an analog output signal in a digital/analog converter. The output is in turn connected to the transmission output stage (not shown here).

The element in the transmission output stage which is influenced by a high crest factor the most is the individual amplifier stages within the transmission output stage of the base station. To ensure adequate signal quality and, in particular, low error rates, it is expedient for the individual amplifiers to have as linear a response as possible in the region of their input amplitude. This is the only way of ensuring the spectral requirements and the quality of the signal. This means that the operating points of the individual amplifier stages need to be chosen suitably so that the amplifier stages do not reach saturation even at high input amplitudes.

These requirements normally result in the power amplifier being given dimensions which are far too great. This results in additional costs for the individual operators of the base stations and increases the space and power requirement. One alternative option is to alter the input signal upstream of the transmission output stage and in this way to reduce the crest factor. This is possible particularly when the requirements for signal quality and the error rate, the "error vector magnitude" and the "peak code domain error" are low or else are not significantly worsened by the altered input signals. Various options for this can be found, by way of example, in the document by N. Hentati and M. Schrader: "Additive Algorithm for Reduction of the Crestfactor" in 5th International OFDM Workshop, Hamburg, September 2000, pp. 27.1 to .5 or else 0. Väänänen, J. Vankka and K. Halonen: "Effect of Clipping in Wideband CDMA system and Simple Algorithm for peak Windowing" in Proc. World Wireless Congress, San Francisco, May 2002, pp. 614 to 619. FIG. 12 shows a known embodiment of the additive method for reducing the crest factor. In this case, the individual filtered signals are corrected by subtracting additional components from the individual signals in order to reduce the crest factor and hence to avoid distortions within the amplifier stages of the base station.

The processing which has been shown using the additive reduction of the crest factor produces additional spectral components, however, which extend the frequency spectrum and thus result in additional errors in the adjacent channels.

BRIEF DESCRIPTION OF THE FIGURES

The invention is explained in detail below using various exemplary embodiments with reference to the drawings, in which.

DETAILED DESCRIPTION OF THE INVENTION

Figure 1:
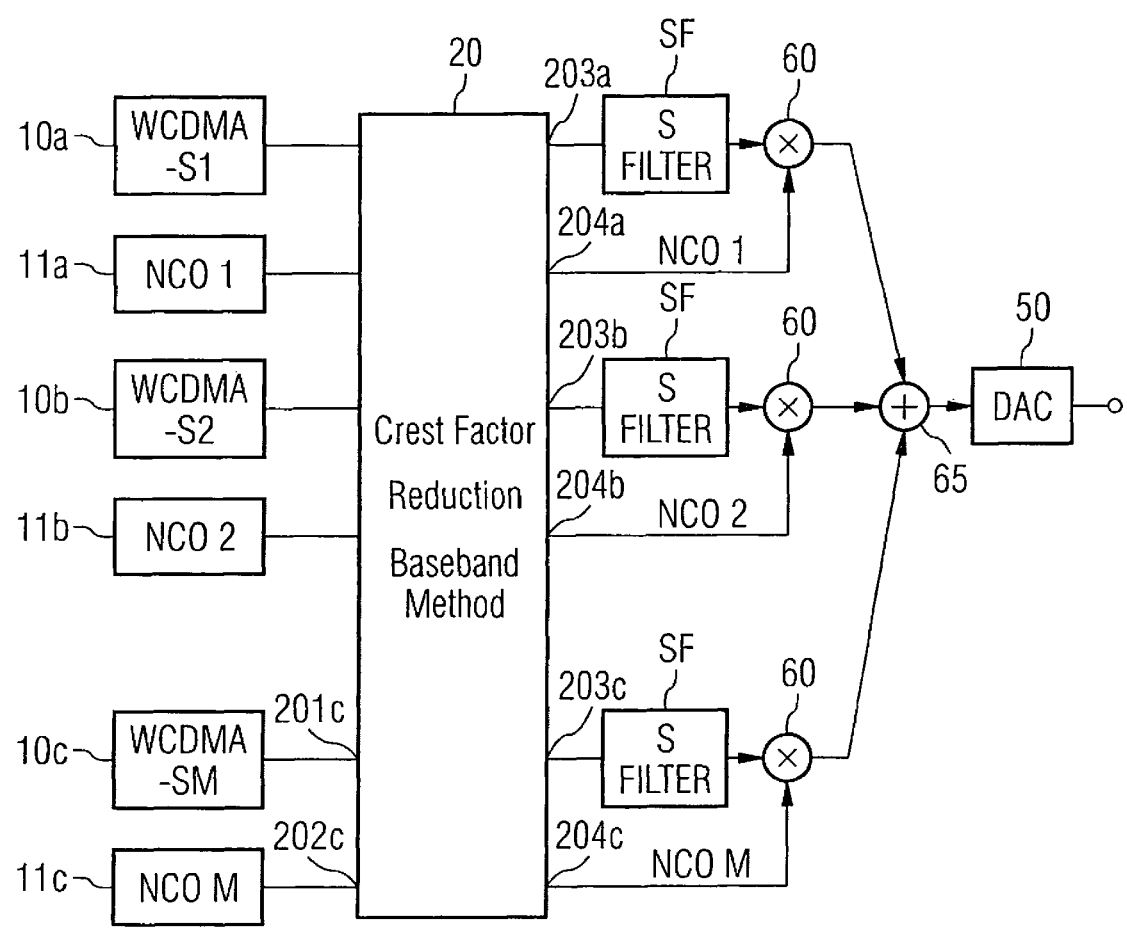
FIG. 1 is a block diagram illustrating an embodiment of the invention.

The present description summarizes further aspects and embodiments of the present invention. In addition, reference is made to the accompanying figures, which form part of the description and use illustrations to show how the invention can be implemented in practical terms. The embodiments in the drawings represent a summary allowing a better understanding to be obtained for one or more aspects of the present invention. This summary is not a comprehensive overview of the invention and also does not intend to limit the features or key elements of the invention to one particular embodiment. Rather, the various elements, aspects and features which are disclosed in the exemplary embodiments can be combined in various ways by a person skilled in the art in order to achieve one or more advantages of the invention. It is to be understood that other embodiments could be used and that structural or logical alterations could be made without departing from the core idea of the present invention. The elements in the drawings are not necessarily true to scale with respect to one another. Identical reference symbols denote similar parts which correspond to one another.

The invention provides for a correction device for reducing a signal dynamic range for the individual input signals, not to be provided only downstream of the shaping filters, but rather for it to be arranged between the individual signal sources and the relevant shaping and interpolation filters provided in the parallel signal paths.

This results in the dynamic range being reduced not just with the already interpolated digital output signal but rather directly within baseband with the digital signals provided by data sources. This allows a further reduction in the crest factor and hence at the same time also the error rate.

In one embodiment, the correction device for reducing the signal dynamic range may advantageously be designed for processing digital signals at the clock rate of the digital signal. Only then in this embodiment do the interpolation and conversion to the higher digital clock frequency take place.

In this embodiment, the correction device may comprise components which estimate a frequency response for its downstream shaping filters. The correction device uses this estimate to alter the signal dynamic range of the digital signals which are output by the individual signal sources. This results in a reduction in the dynamic range and hence in a reduction in the total crest factor. In a further embodiment, the device contains components for estimating the output signals from their downstream shaping filters for various time phases during a time interval. In one embodiment, this time interval may comprise a symbol period, or the period of one clock pulse in the input signal. These components are designed such that they take account of both the amplitude and the phase of the digital input signal and amplitudes and phase of a second signal, associated with the input signal, which is provided by a numerically controlled oscillator and which is used to produce a digital output signal on a desired frequency band.

In another embodiment of the invention, the components respectively comprise a plurality of filters arranged in parallel which operate at the clock rate of the data signal and which are designed to calculate the output value from their downstream shaping filter at a respective instant within a clock interval for the digital input signal.

In another embodiment of the invention, a number of advance calculation units are provided which correspond to four times the number of signal sources which are applied to the input. In another embodiment of the invention, the number of advance calculation units is derived from an oversampling factor of the shaping filters used.

Since the advance calculation unit and later correction may require a certain time, a further embodiment relates to the later signal processing. Provision can therefore be made in one embodiment for the digital input signal to be delayed in time and for it then to be processed in suitable fashion with the corrected signal. This allows correction of the delay caused by the advance calculation unit and the correction.

For this purpose, delay units may be provided in one embodiment which are connected between the input of the correction device and the output of the device. In addition, adders are provided in one embodiment which add the delayed digital input signal to the corrected input signal and supply it to the output.

The advance calculation units allow the time characteristic of the respective input signals to be estimated. In a further embodiment of the invention, account is also taken of whether an amplitude of an input signal or the amplitude of the total signal exceeds a certain threshold value. If this is the case then this is used in one embodiment to calculate an error signal from which the correction factors are calculated using a suitable weighting on the basis of the input signals.

In one embodiment, the invention is suitable for using what are known as multicarrier systems, in which a plurality of signals are output concurrently in adjacent frequency bands of indeterminate bandwidth. In this case, the signals on the individual adjacent frequency bands may be used for different mobile radio standards, that is to say the signals have different modulation types, for example. Suitable weighting in the device thus allows the signal dynamic range to be set individually in each of the frequency bands and to be matched to the signal quality requirements in one embodiment.

A few parameters which are important for signal quality would be, inter alia, a vector error, the "Error Vector Magnitude", and in the case of the UMTS/WCDMA mobile radio standard an adjacent channel power, the "Adjacent Channel Leakage Ratio". The latter should be as low as possible in order to minimize any influence on signals in adjacent channels.

Figure 2:
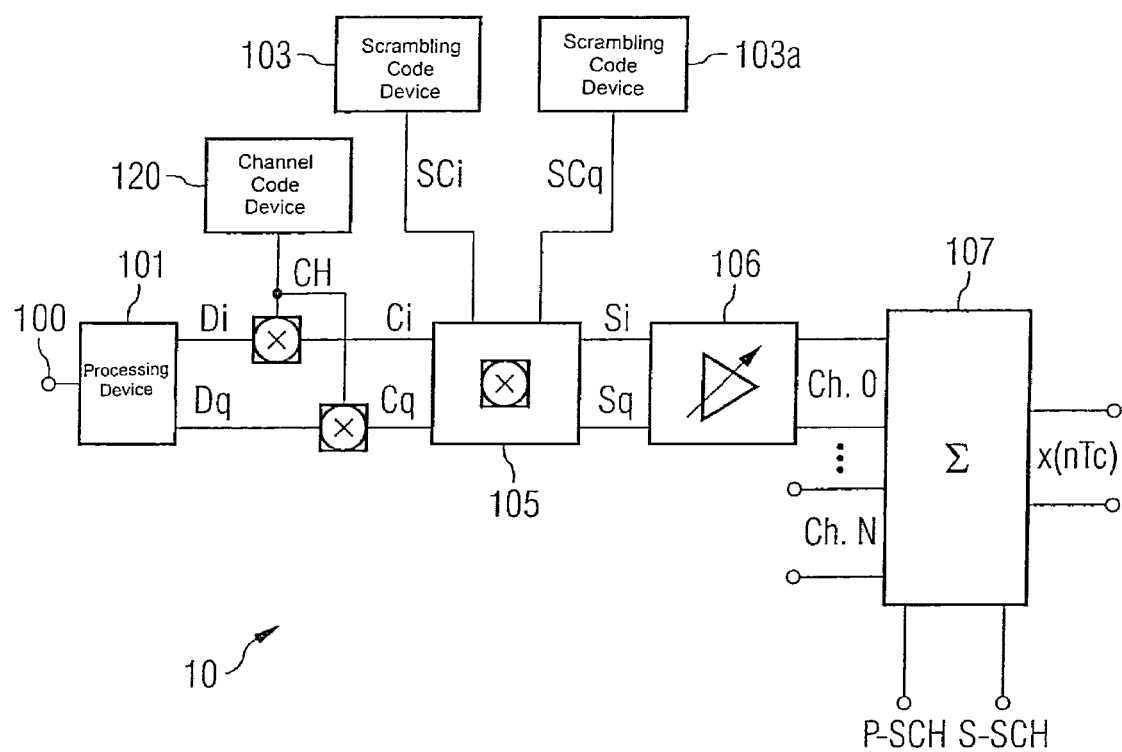
FIG. 2 is a block diagram illustrating an overview of a WCDMA signal path for a base station.

FIG. 2 shows a schematic illustration of a base band unit for producing a WCDMA signal based on the UMTS standard. In this standard, the data to be transmitted are sent simultaneously or at least concurrently to various mobile communication appliances on a single frequency band. To be able to identify the signals sent and to associate the data with a particular mobile communication appliance, however, the UMTS/WCDMA standard involves a signal being processed using a code spreading method (CDMA, Code Division Multiple Access).

In one embodiment, the data to be transmitted are applied to the input 100 and are processed by the device 101. There, the packet structure prescribed on the basis of the standard is stipulated and the data are converted into a digital inphase value Di and a quadrature component value Dq. The data applied to the input 100 are voice data, video data or else text information, for example, which are to be transmitted from the base station to an individual mobile communication appliance. To identify this mobile communication appliance, the data are now spread using what is known as a channel code. The channel code allows the mobile communication appliance to identify the data intended for the appliance and to process them. The channel code is provided by the device 120 for the inphase component Di and the quadrature component Dq, respectively. The channel code is dependent on the transmission rate for the data which are to be sent and is designed such that after the spread inphase component Ci and the spread quadrature component Cq have been spread the chip rate is 3.84 Mcps. The spread digital signals are then multiplied in the device 105 by a scrambling code SCi and SCq. The scrambling code, which is respectively provided for the inphase component and for the spreading component by the devices 103, 103a, is used to identify the base station. The scrambled and spread digital data stream with its components Si, Sq is supplied to the power control device 106. There, the digital signals have their amplitude set on the basis of the external selections. By way of example, it may thus be expedient to reduce or increase the average power for the two components depending on whether the mobile communication appliance is receiving a signal strength which is sufficient for error-free data transmission.

The process of spreading the digital input signals with their inphase component Di and their quadrature component Dq only using an individual channel code and then processing them with a further scrambling code is carried out for different data to various mobile communication appliances. Depending on the chosen data transfer rate, up to 512 data transmission channels Ch. 0 to Ch. N are provided for this purpose, the channel codes being able to be used again when a different scrambling code is used. This allows the number of data transmission channels to be increased even further. These are added in the adder 107 together with control and synchronization channels to form a total signal. These control and synchronization channels include, inter alia, the synchronization channels shown here by way of example, the "primary synchronization Channel" (P-SCH) and the "Secondary Synchronization Channel" (S-SCH). The total digital output signal $x(nT_c)$ is then applied to the output of the adder 107. The clock rate of the digital total signal is Tc=3.84 MHz in the case of the UMTS/WCDMA mobile radio standard and corresponds to a "chip rate".

The embodiment of a digital baseband unit for a WCDMA signal which is shown schematically in FIG. 2 is subsequently based on a WCDMA signal source which is provided for transmission on a particular frequency band. In this context, the output digital signal $x(nT_c)$ is converted into an analog signal and is converted to the output carrier frequency.

FIG. 1 shows a schematic refinement of a base station for multicarrier operation based in one embodiment of the invention. In this case, provision is made for the individual signal sources WCDMA-S1 to WCDMA-SM to be arranged on respective adjacent frequency bands. In one embodiment, this expediently takes place still within the digital signal processing, which means that finally the digital total signal, as the sum from all the signal sources, is converted into an analog output signal by means of a common digital/analog converter 50 and is then converted to the radio-frequency output signal.

For the purpose of operation with multicarrier signals, provision is made for the digital output signals from the individual signal sources WCDMA-S1, 10b to 10c to be shifted to the desired frequency band. This is done using the digital numerically controlled oscillators NCO1, NCO2 to NCOM, which convert the digital signal from the respective signal source 10a, 10b to 10c to the desired frequency band using a multiplier 60. This is done by multiplying the signal from the source by the digital signal from the numerically controlled oscillator, for example. In other words, in one embodiment the signal from the sources is shifted in frequency by means of the numerically controlled oscillator.

On the basis of the different data to be transmitted and the modulation method provided for the standard, it may arise that the maximum output amplitude of the total signal is significantly above an average power or an average amplitude over time.

Figure 10:
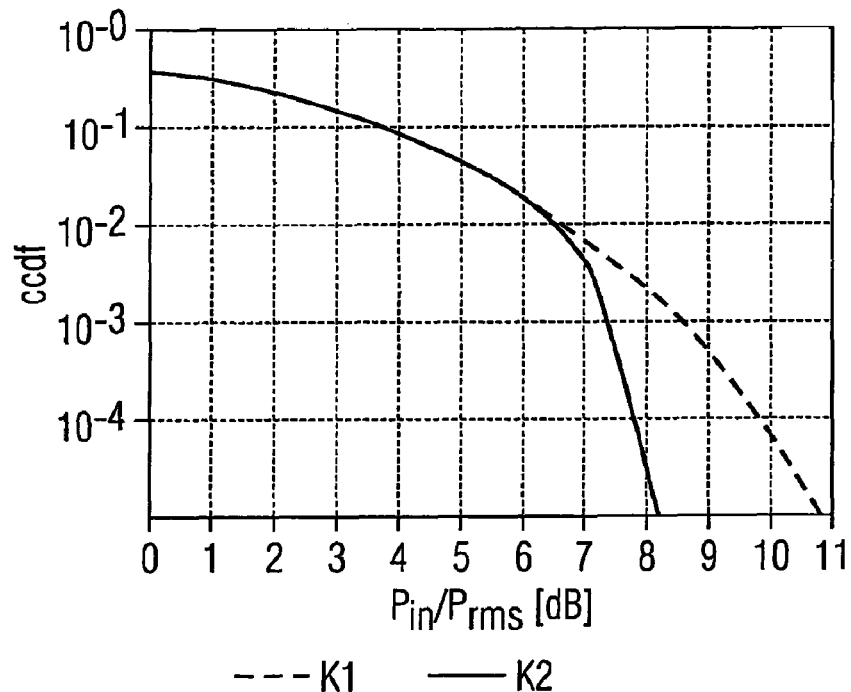
FIG. 10 is a graph with an illustration of a signal probability function CCDF.
Figure 11:
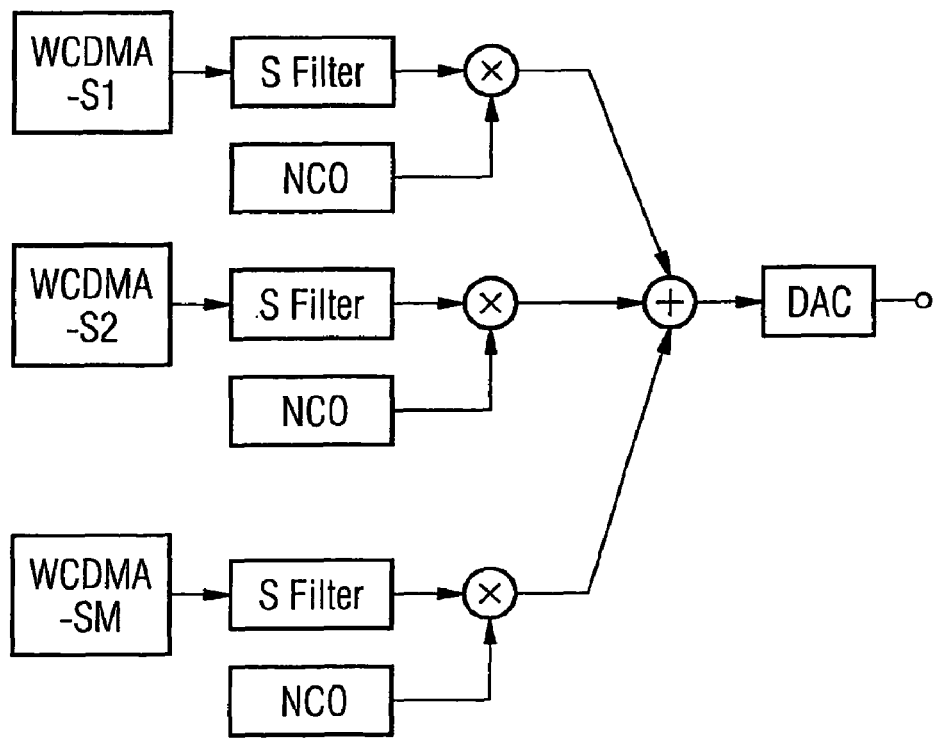
FIG. 11 is a conventional block diagram with fundamental elements for producing a signal based on the UMTS/WCDMA standard.
Figure 12:
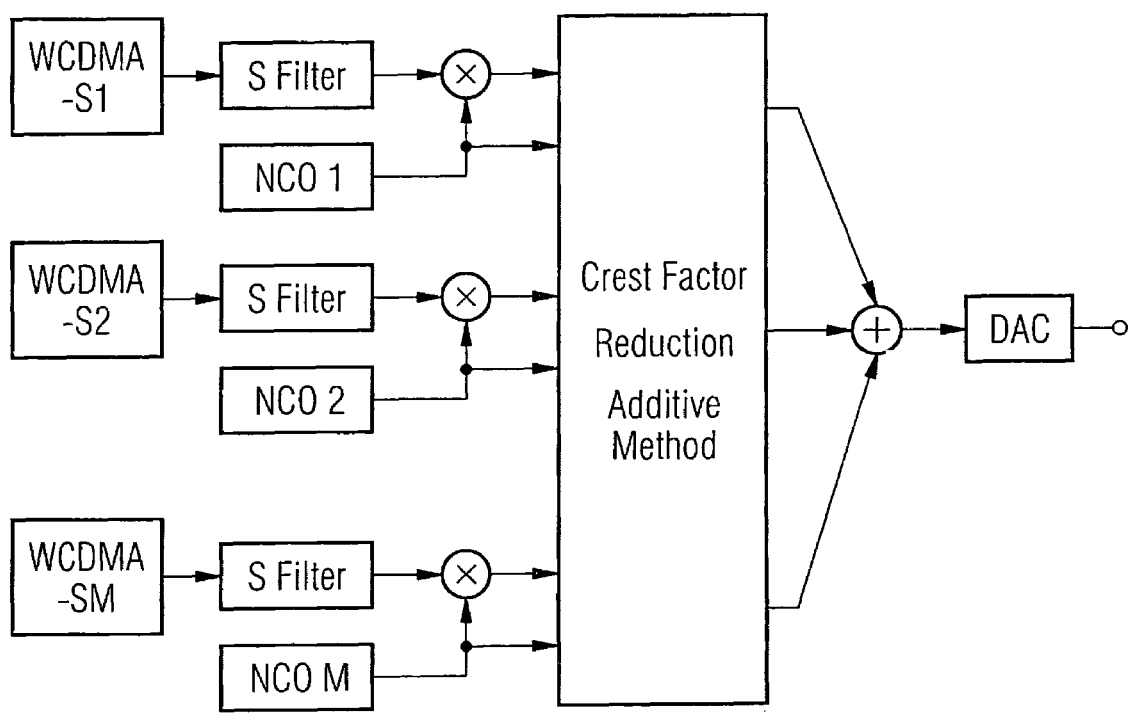
FIG. 12 is a schematic illustration of part of a known base station for multicarrier signals.

This circumstance results in a high crest factor, as can be seen from the graph in FIG. 10, for example. In this case, the probability that an amplitude value will be 11 dB above an average power is approximately 0.01% Particularly in the case of multicarrier signals, a high crest factor may result in the amplifiers provided in the transmission output stage of the base station causing distortions in the output signal and, in this regard, contributing to an increased data error rate. In addition, the distortion broadens the signal spectrum of the signal which is output by the amplifier by intermodulation products. In adjacent channels, this may likewise result in an increased data error rate.

It is thus expedient to reduce the dynamic range of the total output signal and hence to reduce the crest factor. For this process, the embodiment shown in FIG. 1 has a correction device 20 connected between the individual signal sources 10a to 10c and the shaping filters SF of the respective signal sources. The correction device 20 evaluates the amplitudes and phases of the signals supplied by the signal sources and corrects the individual signals accordingly. The correction is made such that a signal dynamic range of the total signal which is present in the adder 65 is reduced. The individual corrected signals are then supplied to the shaping filters SF. The correction device 20 between the signal sources and the shaping filters SF allows the dynamic range of the total signal to be reduced without this resulting in spectral broadening again on account of the downstream shaping filters SF. This becomes possible particularly as the correction device 20 can operate at a very much lower clock rate in the region of the chip rate Tc of the individual signal sources 10a to 10c.

Figure 3:
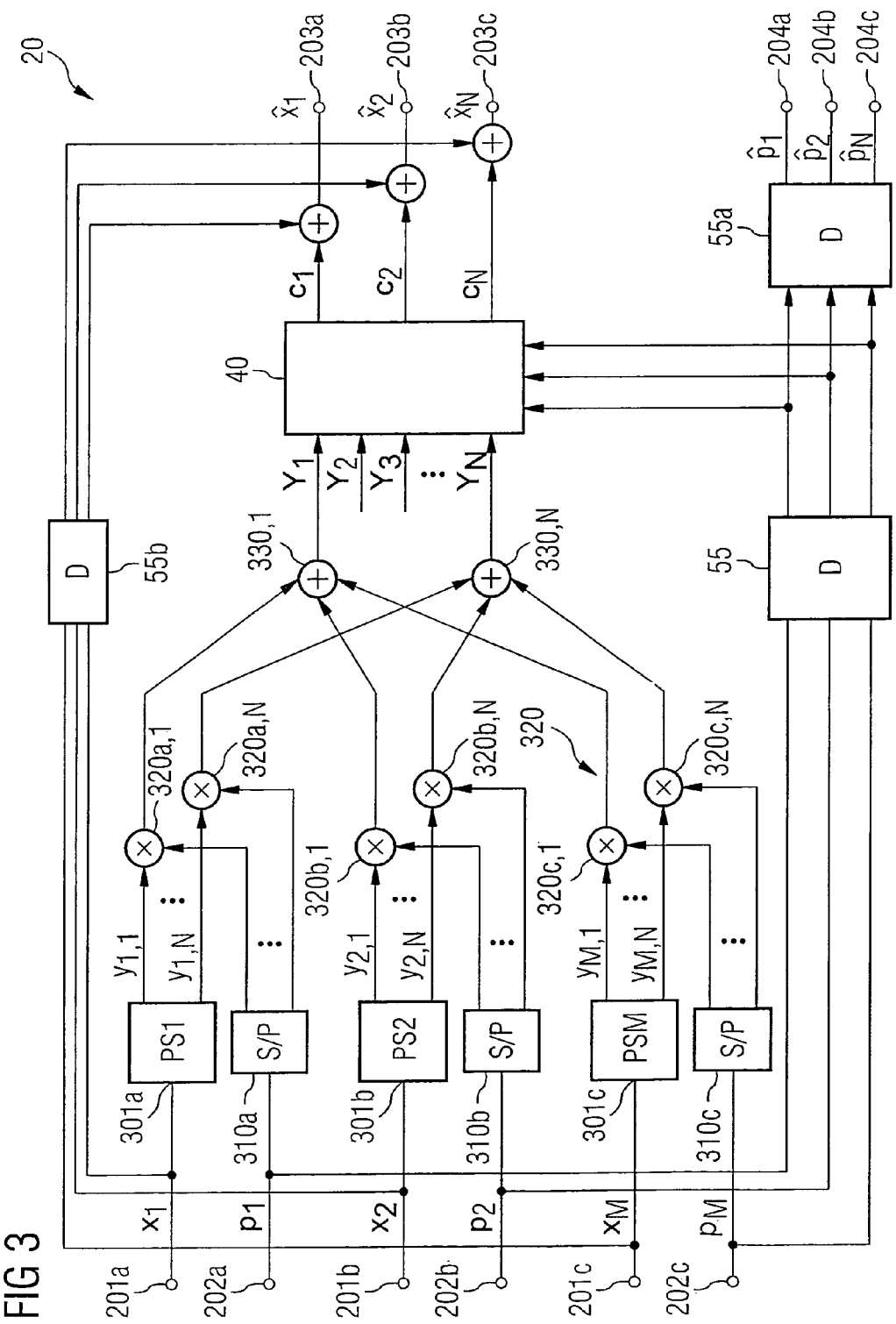
FIG. 3 is a block diagram illustrating a refinement of a device for reducing a signal dynamic range for a multicarrier signal according to another embodiment.

FIG. 3 shows one exemplary embodiment of the correction device 20. It contains the input connections 201a, 201b and 201c for supplying the digital data stream $X_1$, $X_2$, $X_M$ from the individual signal sources 10a, 10b and 10c. Further connections 202a, 202b and 202c are used to supply the signals $P_1$, $P_2$ to $P_M$ from the numerically controlled oscillators NCO1, NCO2 to NCOM. At the output, the output taps 203a, 203b and 203c are provided for the corrected signal $\hat{x}_1$, $\hat{x}_2$ to $\hat{x}_m$. The further output taps 204a, 204b and 204c are used to output delayed signals $P_1$, $P_2$ to $P_M$ from the numerically controlled oscillators NCO.

The correction device 20 comprises a plurality of forecast devices PS1, PS2 to PSM. Their respective inputs 301a, 301b to 301c are connected to the respective input connection 201a, 201b or 201c. Each forecast device PS1 to PSM is designed to determine the output signal or the response from the shaping filters connected to the correction device 20 for various time phases during a clock period Tc. At the output, the forecast devices PS1, PS2 to PSM respectively have N taps from which it is possible to tap off a respective forecast signal element. Specifically, the first forecast unit PS1 outputs a forecast for the first digital signal $x_1$ supplied to it. This forecast comprises the signal elements $y_{1,1}$ to $y_{1,N}$. Accordingly, the forecast unit PS2 produces the forecast for the second signal element $x_2$ and the forecast unit PSM produces the forecast with the signal elements $y_{M,1}$ to $y_{M,N}$ for the data stream $x_M$. To obtain a further forecast for a later frequency shift using a numerically controlled oscillator, it is necessary to multiply these forecast data from the shaping filter by the corresponding complex phase information from the digital oscillator signals $p_1$ to $p_M$. To this end, the input connections 202a, 202b to 203c are connected to a respective serial/parallel converter 310a to 310c. The output of said converter has a total of N taps which are used to provide a respective phase information item at an instant in the clock Tc for the respective input signal $p_1$, $p_2$ to $p_M$. The respective phase information item is multiplied by the respective forecast signal $y_{1,1}$, $y_{1,N}$ to $y_{M,1}$, $y_{M,N}$ in a multiplier. To this end, the output of each forecasting device PS1, PS2 to PSM is connected to an appropriate multiplier. A respective second input is supplied with the phase information item which is accordingly provided by the serial/parallel converter 310a, 310b, 310c.

The correction device also contains adders 330,1 to 330,N. The input of these is connected to an output of the multipliers 320a,1 to 320a,N 320b,1 to 320b,N and 320c,1 to 320c,N. In this embodiment, each adder is coupled precisely to the multiplier in the relevant forecast device, which has the phase value of the same sampling instant. The total forecast signals $Y_1$, $Y_2$ to $Y_N$ summed in this way are supplied to a correction device 40.

In general, in one embodiment, it may be assumed that for each clock period Tc a total of four different time phases are sufficient to determine the response of the downstream shaping filters to a sufficient extent. Since the total signal bandwidth is significantly greater for a system with a plurality of carrier frequencies than for what is known as a single-carrier system, it is advantageous to increase the number N of forecasts likewise. Thus, in one embodiment, a minimal number N of forecasts of N=4×M is obtained for a number M of adjacent frequency channels with a respective signal bandwidth, for example. It follows from this that, in the present example of a base station with three forecasting devices PS1, PS2 and PSM, a total of twelve forecasts should be made with each individual forecasting device. If the individual frequency bands for transmitting the data stream are not adjacent, the required number of forecasts becomes greater. This is on account of the fact that the number of forecasts is dependent on the bandwidth of the total signal. This bandwidth is essentially obtained from the values for the numerically controlled oscillators NCO.

Figure 4:
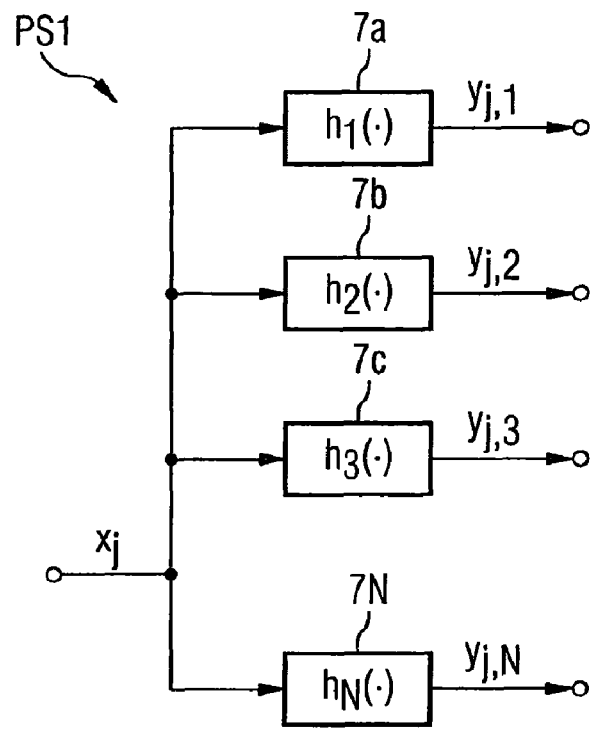
FIG. 4 is a block diagram illustrating a first embodiment of the advance calculation unit.

FIG. 4 shows a first implementation of the forecast devices according to one embodiment. In this embodiment, the forecast device comprises a number N of filter banks 7a, 7b to 7N arranged in parallel which operate at the clock rate $T_c$. These produce the total of N forecast signals $y_{j,1}$, $Y_{j,2}$ to $y_{j,N}$ for the input data stream $x_j$. The implementation shown allows a high level of accuracy for the forecast but in return requires a relatively high level of computation complexity in the individual filters.

Figure 5:
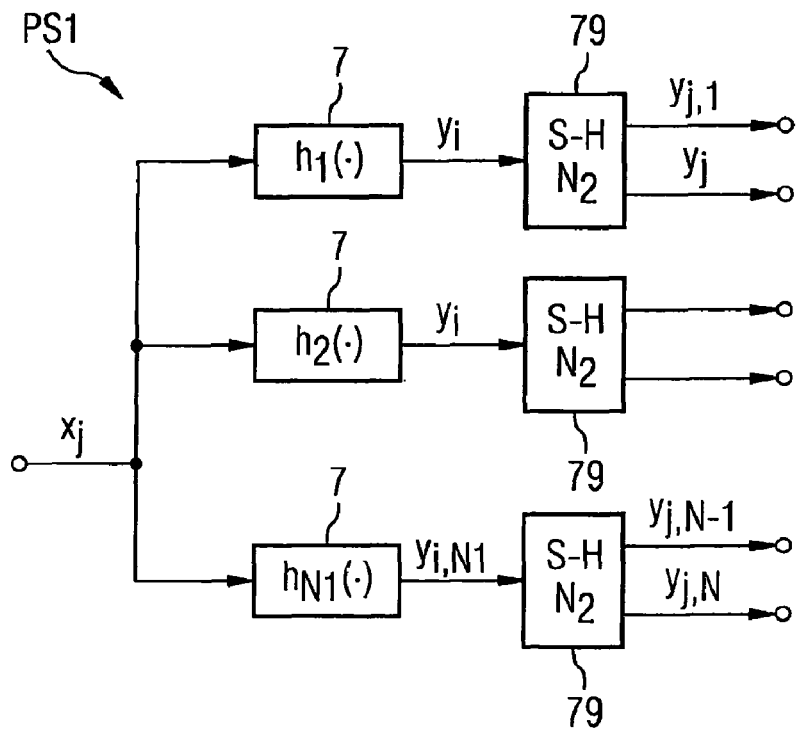
FIG. 5 is a block diagram illustrating a second embodiment of an advance calculation unit.

FIG. 5 shows an alternative embodiment of the forecast device operating at a lower level of computation complexity. In this case, the total number of filters 7 is reduced. There are therefore N1 filters 7 arranged in parallel. An accurate forecast for the downstream interpolation filters therefore cannot yet be implemented, however. The missing forecasts are achieved by simply repeating a forecast for a total of $N_2$ samples, where: N=N1×N2, with N1 being the number of filters 7 and $N_2$ indicating the number of samples for each filter. The output signals $y_j$ from each filter 7 are supplied to a respective sample and hold circuit for $N_2$ different samples in each case. The circuit is used to store and repeat the forecast for the respective value $y_j$. In the example in FIG. 5, the value for $N_2$ is 2. This reduces the number of filters 7 required for the full forecast by the factor 2. The missing time phase forecasts differ primarily in phase, but not significantly in their amplitude, which means that a corresponding reduction in the complexity on the forecast device does not make a significant contribution to worsening the forecast.

The individual time phases for a forecast can normally be distributed evenly over one clock period $T_c$. However, it is expedient in one embodiment, if the total of N forecasts is dependent on the oversampling factor in the interpolation filters 50. By way of example, the number N of forecasts may be a value which forms an integer devisor for the oversampling factor. This also simplifies extraction of the phase information from the signals from the numerically controlled oscillators to a considerable degree. Thus, a suitable choice of the value N for the forecasts allows simple serial/parallel conversion to be carried out in order to obtain the relevant phase information for the individual numerically controlled oscillator signals.

Figure 6:
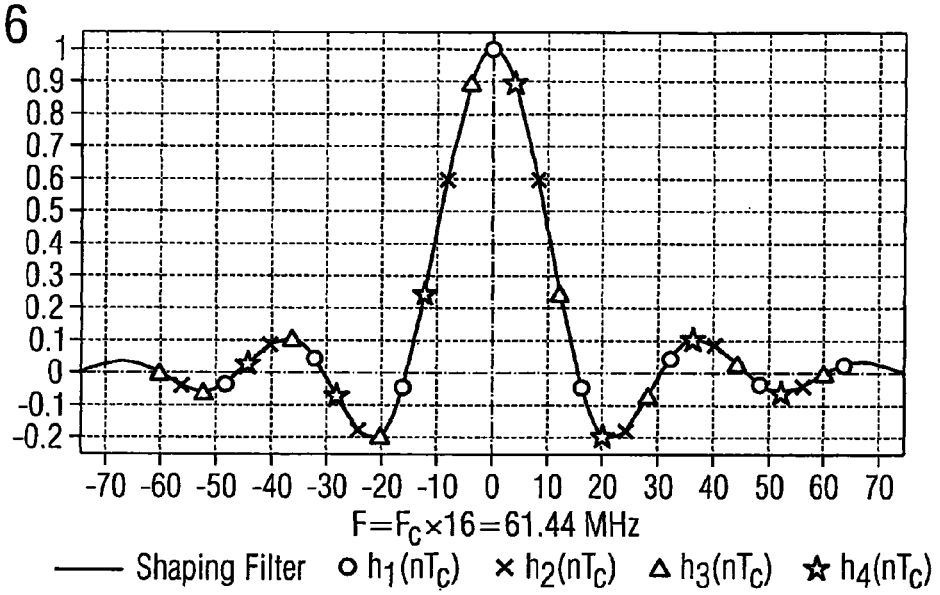
FIG. 6 is a graph illustrating an impulse response from a shaping filter with filter responses based on the advance calculation unit according to one embodiment.

FIG. 6 shows a simulation for such a forecast for an interpolation filter which has the filter response shown in FIG. 6. Overall, four forecasts N=4 are made using four individual filters $h_1$ to $h_4$ in the forecast device. Despite the small number of coefficients per filter, an oversampling factor of 16 for the interpolation filter produces a sufficiently good forecast.

In addition to the transfer functions of the interpolation filters, further effects can be taken into account in the forecast devices in one embodiment. These include, by way of example, the response of the downstream digital/analog converter, its reconstruction filter and the response of analog components. The forecast devices actually allow an estimate to be ascertained for the signal dynamic range in the individual data streams, and suitable measures to be taken, in advance.

Referring again to FIG. 4, the forecast output signals $y_{j,1}$, $y_{j,2}$ to $y_{j,N}$ for each of the forecasting units j are multiplied by the phase information from the associated numerically controlled oscillator signals and are then added in the adders 330,1 to 330,N. This gives a forecast for the total carrier signal $Y_1$ to $Y_N$. This forecast for the total carrier signal is supplied to an arrangement 40 for producing the correction values. The values, which add up to form the actual input signals $x_1$, $x_2$ to $x_M$, so as not to exceed the desired crest factor. In addition, the arrangement 40 is supplied with time-delayed numerically controlled oscillator signals. The delay by the delay unit 55 is chosen such that it corrects the delay brought about in the forecast devices PS1, PS2 to PSM, in the multipliers 320 and in the adders 330.

Figure 9:
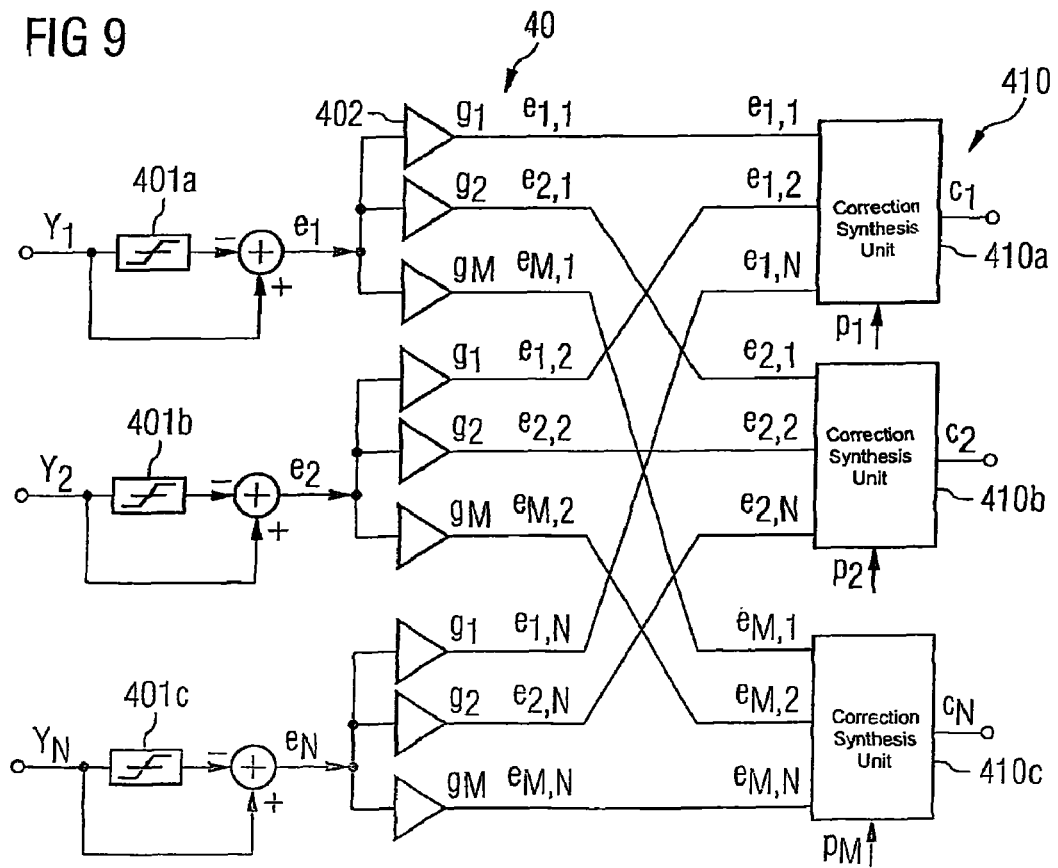
FIG. 9 is a block diagram illustrating a third embodiment of the correction device.

FIG. 9 shows an embodiment of the device 40. This device contains a plurality of threshold value detectors 401a, 401b and 401c whose inputs are connected to the connections for supplying the total forecast signals $Y_1$, $Y_2$ to $Y_N$. The threshold value detectors produce an error signal $e_1$, $e_2$, $e_{1N}$ on the basis of whether the amplitude of the total forecast signal exceeds a threshold value (δ). Generally, this produces the error signal $e_i(nT_c)$ from the following equation:

$$e_i(nT_c) = \begin{cases} 0 & \text{if } |Y_i(nT_c)| \leq \delta \\ x_i(nT_c) - \dfrac{Y_i(nT_c)}{|Y_i(nT_c)|} \cdot \delta & \text{if } |Y_i(nT_c)| > \delta \end{cases} \quad 5$$

If the total forecast signal does not exceed the threshold value then the error signal is $e_i(nT_c)=0$.

The total of N error signals $e_1, e_2$ to $e_N$ are distributed over the number of M data streams $x_1, x_2$ to $x_M$ applied to the input. In this case, it is possible to assign an appropriate weighting g to each individual error signal for each data stream. In the exemplary embodiment described, there are three data streams, i.e. M=3. The error signal $e_1$ is accordingly divided into three error signal elements $e_{1,1}, e_{2,1}$ to $e_{M,1}$. Each of these error signals, which are obtained from a first total forecast signal $Y_1$, can be weighted by means of an appropriate selection of the factors $g_1, g_2$ to $g_M$. Such weighting is performed for each of the error signals $e_1, e_2$ to $e_N$. In this case, the weighting is expediently chosen such that the sum of the factors $g_i$ gives the value $$\sum_{i=1}^{M} g_i = 1.$$

The greater the weighting $g_i$, the greater the correction contribution which influences the relevant data stream i. By way of example, one simple option is to distribute the weightings $g_i$ in equal parts over the individual data streams. As a result, each data stream is influenced with the same distortion.

The weighted error signals $e_{1,1}, e_{2,1}, \ldots, e_{M,1}, e_{1,2} \ldots$ to $e_{M,N}$ are then re-sorted and combined as appropriate. Thus, the j error signals $e_{i,j}$ for each data stream i are combined, where j=1 . . . N and i=1 . . . M. These are supplied to a correction synthesis block 410a, 410b or 410c together with the corresponding phase information $p_i$ from the numerically controlled oscillators. The correction synthesis blocks 410a, 410b and 410c produce the correction values for reducing the signal dynamic range from the supplied error signals together with the information from the numerically controlled oscillator signal.

Figure 8:
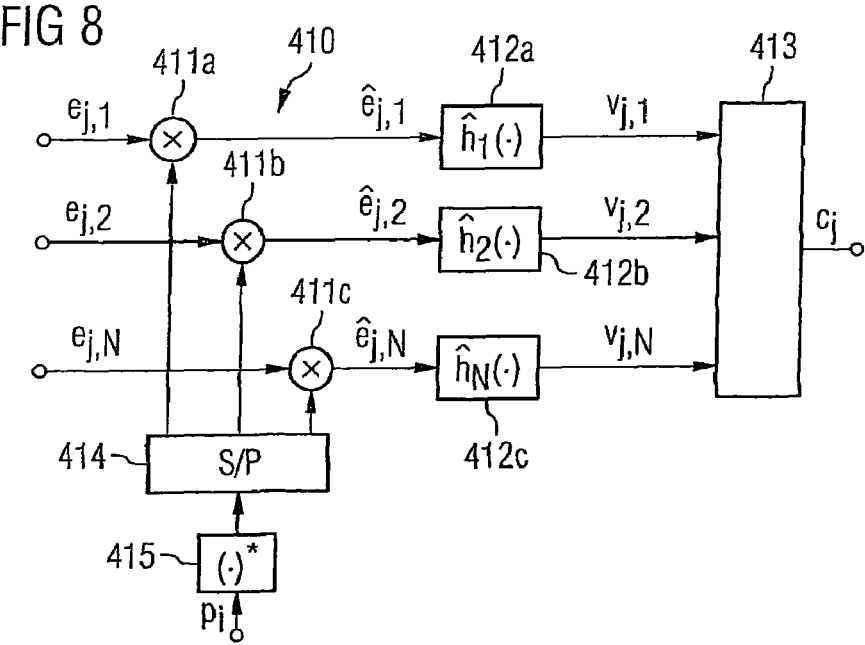
FIG. 8 is a block diagram illustrating a second embodiment of the correction device.

FIG. 8 shows one embodiment of such a correction synthesis block. The inputs of each correction synthesis block 410 for the weighted error signals $e_{j,1}, e_{j,2}$ to $e_{j,N}$ are respectively connected to one of the multipliers 411a, 411b and 411c. These multiply the weighted error signals by the corresponding delayed complex conjugate phase information from the numerically controlled oscillator signal $p_j$. To this end, the respective second inputs of the multipliers are connected to a serial/parallel converter 414. The input of this serial/parallel converter is supplied with the complex conjugate numerically controlled oscillator signal $p_j$ produced by means of a device 415.

This procedure converts the weighted error signals $e_{j,1}, e_{j,2}$ to $e_{j,N}$ obtained from the total forecast signals $Y_1$ to $Y_N$ carrying the phase information back to baseband. Such conversion is necessary because the error signals need to be used to calculate a correction value for the respective data stream in base band. Since the envisaged correction for the individual data streams can sometimes be identified as additional noise and hence impairs the signal quality, it is expedient to provide a correction value which has only slight effects on the output power. This can be achieved by additional filter measures. To this end, the error signals $\hat{e}_{j,1}, \hat{e}_{j,2}$ to $\hat{e}_{j,N}$ converted to baseband are supplied to a respective filter 412a, 412b and 412c. In this case, the filter transfer function $\hat{h}_1, \hat{h}_2$ to $\hat{h}_N$ is $$\hat{h}_l(lT_c) = \frac{h_l(-lT_c)}{\sum_l h_l^2(lT_c)}$$

The filter transfer functions are an inverse-time replica of the forecast filters. In addition, they have their energy normalized. The correction values $v_{j,1}, v_{j,2}, v_{j,N}$ normalized in this manner in baseband at the clock rate $T_c$ are combined in an arrangement 413 to form a correction value $c_j(nT_c)$. To this end, the total of N normalized complex-value correction values $v_{j,1}, v_{j,2}, v_{j,N}$ are divided into their real and imaginary parts and the respective largest amplitude is used. For this, in one embodiment, the following is true:

$$c_{j,re}(nT_c) = R[v_{j,1}(nT_c)]$$

if $|R[v_{j,2}(nT_c)]| > |c_{j,re}(nT_c)|$ then $c_{j,re}(nT_c) = R[v_{j,2}(nT_c)]$

. . .

if $|R[v_{j,N}(nT_c)]| > |c_{j,re}(nT_c)|$ then $c_{j,re}(nT_c) = R[v_{j,N}(nT_c)]$ $$c_{j,im}(nT_c) = J[v_{j,1}(nT_c)]$$

if $|J[v_{j,2}(nT_c)]| > |c_{j,im}(nT_c)|$ then $c_{j,im}(nT_c) = J[v_{j,2}(nT_c)]$

. . .

if $|J[v_{j,N}(nT_c)]| > |c_{j,im}(nT_c)|$ then $c_{j,im}(nT_c) = J[v_{j,N}(nT_c)]$ The correction signal $c_j(nT_c)$ is then made up of the real part $c_{j,re}(nT_c)$ and the imaginary part $c_{j,im}(nT_c)$. Next, this correction value is added to the delayed data stream $x_j$ and is supplied to the output 203a, 203b or 203c as a corrected signal.

Figure 7:
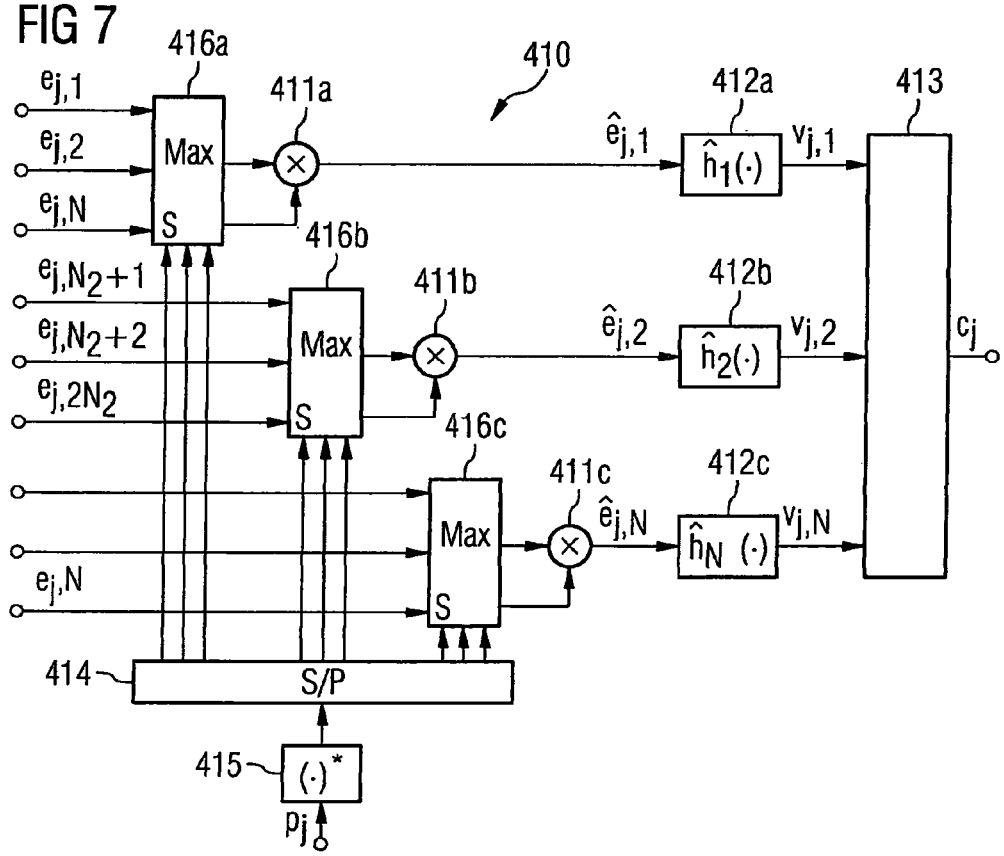
FIG. 7 is a block diagram illustrating a first embodiment of the correction device.

Another embodiment of the synthesis is shown in FIG. 7. In this embodiment, the number of filters and of complex multipliers is again reduced. This also reduces the complexity of implementation of the block 410. Components which have the same action or function bear the same reference symbols. In this embodiment, the number of filters 412a, 412b, 412c has been reduced by combining the total of N input signals into $N_1$ groups containing $N_2$ input signals each. Again, $N=N_1 \times N_2$.

In this case, the N weighted error signals $e_{j,1}, e_{j,2}$ to $e_{j,N}$ are processed such that $N_2$ adjacent error signals are combined. In this context, adjacent is to be understood to mean that the error signals have been combined from total forecast signals $Y_1, Y_2$ which are adjacent in terms of phase. The complex conjugate phase information from the numerically controlled oscillator signal is combined in the same way.

The weighted and combined error signals $e_{j,1}$ to $e_{j,N2}$ and the relevant phase information are supplied to a selection device 416a. This ascertains which of the respectively supplied error signals $e_{j,1}, e_{j,2}$ to $e_{j,N2}$ is largest. The largest error signal is output together with the corresponding phase information at the output and is supplied to the respective multiplier. The selection blocks 416a, 416b and 416c therefore select the adjacent error signals such that the respective largest error signal is applied to the multiplier together with the corresponding phase information. The two signals are multiplied in complex fashion in order to ascertain the baseband error $e_{j,1}$. This selection, which has already been made in advance, allows simple implementation of the block 413.

The embodiment shown allows correction of the signal dynamic range on a symbol rate and particularly prior to interpolation by shaping filters. This allows the crest factor to be reduced by approximately 2.5 dB in this example, as shown in curve K2 in FIG. 10. In other embodiments, the improvement may also turn out to be greater. This allows the amplifiers within the transmission output stage to be operated in a linear region of their characteristic curve. Similarly, it is possible to reduce the magnitude and the power consumption of the amplifiers within the transmission output stage. At the same time, the effect achieved by the inventive arrangement is that despite a reduction in the crest factor there is no significant worsening of the "Error Vector Magnitude" or the adjacent channel power. The invention is not limited to multicarrier signals in this context. Very wideband single-carrier signals with high crest factors can also have their crest factor reduced by the inventive arrangement while at the same time essentially retaining the signal quality.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the scope of equivalents to which such claims are entitled.

It is emphasized that the Abstract is provided to comply with 37 C.F.R. section 1.72(b) requiring an abstract that will allow the reader to quickly ascertain the nature and gist of the technical disclosure. It is submitted with the understanding, that it will not be used to interpret or limit the scope or meaning of the claims.

The invention claimed is:

1. A method for reducing a signal dynamic range, comprising:
   producing a first digital signal on a first carrier frequency, and at least one second digital signal on a second carrier frequency using first and second clock signals, respectively, the first and second clock signals having a respective clock frequency;
   evaluating an amplitude component of the first and second digital signals by forecasting an impulse response from each of a first filter and a second filter, respectively, for different instants within a clock period of the respective clock frequency;
   ascertaining a correction factor by comparing the evaluated amplitude components with a threshold value;
   selectively altering at least one signal from the set of the first and at least one second signal with the correction factor;
   filtering the at least one altered signal of the first and the at least one second digital signal with a respective one of the first filter and the second filter; and
   adding the filtered signals to form a total signal.

2. The method of claim 1, wherein evaluating an amplitude component comprises:
   producing a plurality of forecast signals that respectively represent an output value which is brought about at different instants within a clock period of the respective clock frequency by a forecast impulse response of the filter;
   combining the forecast signals produced from the first and the at least one second digital signal to form a total forecast signal such that the output values respectively produced for the same instant within a clock period of the respective clock frequency are combined.

3. The method of claim 2, wherein the number of forecast signals for each signal corresponds at least to four times the number of the first and the at least one second signal.

4. The method of claim 1, wherein the filtering comprises interpolating the at least one altered signal or the first and the at least one second digital signal.

5. A circuit arrangement for reducing the crest factor, comprising:
   a first signal generator configured to produce a first digital signal with a clock period, the first digital signal having an amplitude component;
   a second signal generator configured to produce a second digital signal, the second digital signal having an amplitude component;
   a correction device whose input is connected to the first and the second signal generator and which has a first and a second output;
   a first shaping filter for interpolation, connected to the first output of the correction device;
   a second shaping filter for interpolation, connected to the second output of the correction device; and
   a summation component connected to the first and the second shaping filter, and configured to add together the digital signals which are output by the first and the second shaping filter;
   wherein the correction device comprises:
      a first forecast device configured to receive the first digital signal and generate a first forecast output reflecting a forecast impulse response of the first shaping filter comprising a plurality of first signal elements, wherein each of the plurality of first signal elements is associated with a respective one of a plurality of different phases associated with the clock period;
      a second forecast device configured to receive the second digital signal and generate a second forecast output reflecting a forecast impulse response of the second shaping filter comprising a plurality of second signal elements, wherein each of the second signal elements is associated with a respective one of the plurality of different phases associated with the clock period;
      an adder component configured to sum respective first and second signal elements of a given phase for each of the plurality of different phases, thereby generating a plurality of total forecast signals associated with the plurality of different phases; and
      a correction value generator configured to receive the plurality of total forecast signals and generate correction values based on the plurality of total forecast signals.

6. The circuit arrangement of claim 5, further comprising:
   a first and second plurality of mixing devices associated with each of the first and second forecast devices, wherein each of the plurality of first and second mixing devices is associated with a respective one of the plurality of different phases associated with the clock period; and first and second numerically controlled oscillators coupled to each of the first and second plurality of mixing devices of the first and second forecast devices, respectively, wherein the first mixing devices are configured to multiply a first plurality of digital oscillator signals from the first numerically controlled oscillator with respective ones of the plurality of first signal elements to generate frequency shifted first signal elements, and wherein the second mixing devices are configured to multiply a second plurality of digital oscillator signals from the second numerically controlled oscillator with respective ones of the plurality of second signal elements to generate frequency shifted second signal elements.

7. The circuit arrangement of claim 6, wherein the first and second numerically controlled oscillators are configured to generate a first and second plurality of digital oscillator signals associated with different frequencies.

8. The circuit arrangement of claim 6, wherein the adder component is configured to sum respective first and second frequency shifted elements of a given phase for each of the plurality of different phases to thereby generate the plurality of total forecast signals.

9. The circuit arrangement of claim 5, wherein each of the first and second forecast devices comprise a plurality of filters, wherein each of the plurality of filters is associated with a respective one of the plurality of different phases, and wherein an output of each of the plurality of filters provides collectively the plurality of first and second signal elements, respectively.

10. The circuit arrangement of claim 5, wherein each of the first and second forecast devices comprise:
a first number of filters configured to generate a forecast; and
a first number of sample and hold circuits configured to repeat the forecast from a respective filter a predetermined number of times, wherein the first number multiplied by the predetermined number corresponds to the plurality of different phases of the clock period.

11. The circuit arrangement of claim 5, wherein the correction value generator is configured to produce an error signal from a comparison between each of the plurality of total forecast signals and a threshold value, thereby resulting in a plurality of error signals.

12. The circuit arrangement of claim 11, wherein each error signal is dependent on the threshold value when the threshold value is exceeded.

13. The circuit arrangement of claim 11, wherein the correction value generator is further configured to generate the correction values based on the plurality of error signals.

14. The circuit arrangement of claim 11, wherein the correction value generator further comprises one or more weighting factors for each of the plurality of error signals, and wherein the correction value generator is configured to generate the correction values based on the plurality of weighted error signals.

* * * * *